UNITED STATES PATENT OFFICE.

NICOLAUS SCHRÖDER, OF CREUZNACH, PRUSSIA.

IMPROVEMENT IN EXTRACTING FUEL FROM WASTE.

Specification forming part of Letters Patent No. 206,266, dated July 23, 1878; application filed September 14, 1876.

*To all whom it may concern:*

Be it known that I, NICOLAUS SCHRÖDER, of Creuznach, Prussia, have invented a new and useful Method of Separating Unconsumed Coal from its Ashes and other impurities; and I do hereby declare the following to be a clear and exact description of the nature thereof, sufficient to enable others skilled in the art to which my invention appertains to fully understand, make, and use the same.

My invention consists in obtaining fuel, &c., from the unconsumed offal or ashes of stone-coal as found upon railroads, in iron and glass works, and all places and purposes wherein such fuel is employed.

In carrying out my invention I employ two hand-sieves, placed one upon the other, said sieves being of similar size, form, and adaptability, and in them I place a quantity of offal and subject them to a thorough shaking operation, the well-known shuttle-block being preferably employed, whereby the sand, dust, ashes, and useless substances fall through the sieves, and the coarse parts remain therein. I now submerge the sieves, with their contents, in a large water-tank and move them up and down, whereby the light combustible parts of the contents of the sieve appear on top, and the heavy substances, such as slate and stone, fall to the bottom of the sieves. I now press the sieves more forcibly into the water, by which the light combustible particles in the top of the sieve are raised, or in a manner caused to float in the space of the sieve, and quickly draw the sieves out of the tank, holding them in a tilted or sloping position, whereby said combustible particles fall into the tank, from whence they may be collected or emptied. The heavy matters remaining in the sieves are cast away as useless.

Having thus described my invention, what I claim as new, and desire to secure by Letters Patent, is—

The method herein described of separating unconsumed coal from its ashes and other impurities, which consists in first screening in sieves the unconsumed coal with its ashes and impurities, to remove the ashes, sand, dust, and lighter materials; then submerging the sieves with their contents in a water-tank, and imparting a vertically-reciprocating movement to them, whereby the light combustible parts will float on the top, and the heavier materials sink; and, finally, in tilting the sieves, so that the light combustible materials will float on the water in the tank, leaving the heavier materials in the sieves, substantially as and for the purpose set forth.

NICOLAUS SCHRÖDER.

Witnesses:
JOHN A. WIEDERSHEIM,
A. P. GRANT.